9741½X
H. DURELL.
COMB.
Patented June 20, 1836.
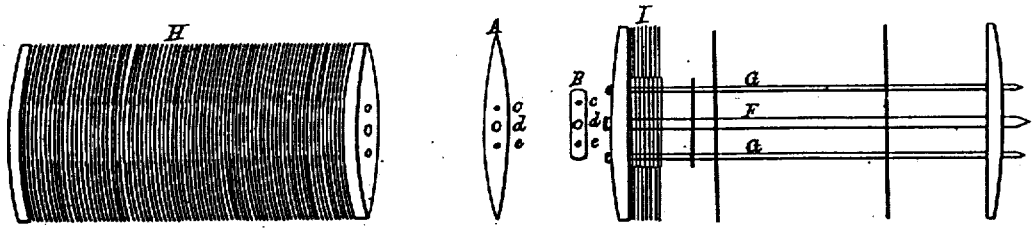
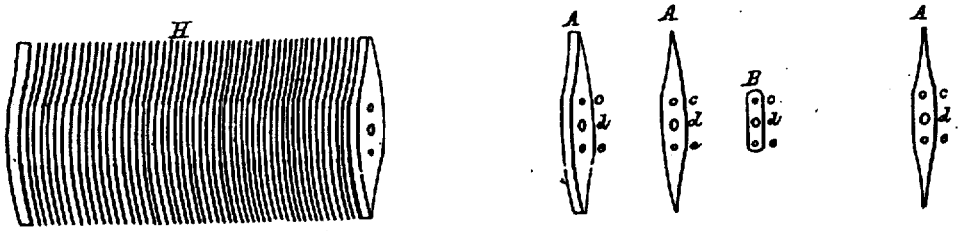
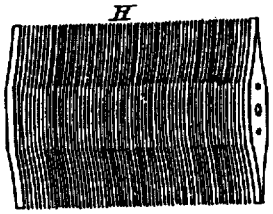
THE NORRIS PETERS CO., PHOTO-LITHO., WASHINGTON, D. C.

Henry Durell
Letters Patent

The Schedule referred to in these Letters Patent and making
part of the same containing a description in the words of the
said Henry Durell himself of his improvement in the
construction of combs from metal:
To all to whom these presents shall come. Be it known that
I Henry Durell of the City and County of New York and
State of New York have invented a new and useful improvement
in the construction of combs from metal (commonly made of
ivory horn bone wood &c) and that the following is a full and
exact description of the construction of said combs as invented or
improved by me viz. I prepare plates of metal by cutting or punch
ing of the forms represented at A & B. with one or more holes
made therein as c. d. e. at the proper distance from each other
I then take a thick piece of the form of A. for one end of the
comb and fixing a [illegible] wire or rod in each of its holes I insert
these wires or rods through the similar holes in the plate
B. which is of suitable thickness to regulate the distances between
the teeth. I then put on the wires or rods another plate of the form
of A. suitable in thickness to form the tooth and so on alternately
until the comb is the proper length. I then put on a thick plate
similar to the first on which is rivetted or otherwise fastened the
ends of the wires or rods. The comb is now brought to the proper
shape by grinding or filing and finished by polishing or burn-
ishing. Combs manufactured in this manner possess several
advantages over those in common use inasmuch as they are far
more durable likewise possess a degree of flexibility by which they
can be made to adapt themselves to the conformation of the head.
the teeth do not easily choke up and being made of elastic
metal are not likely to be broken off. What I claim as new
and as my own invention or improvement and for the use of
which

9741½X which Sash an equivalent privilege as the constitution of combs out of delicate plates or pieces of metal with holes made therein joined and secured together on wire or wires rod or rods as herein described Witnesses Henry Darell Orceon S. Warren Leonard T. Gale Brown Filed 468 wds

1871.